Oct. 13, 1970  T. H. PAPWORTH ET AL  3,533,806

GRAIN PRESERVATIVE METHOD

Filed Sept. 26, 1967

INVENTORS
THOMAS H. PAPWORTH
WILLIAM C. BROTHERS

BY

Wolf, Greenfield & Hieken

United States Patent Office 3,533,806
Patented Oct. 13, 1970

3,533,806
GRAIN PRESERVATIVE METHOD
Thomas H. Papworth and William C. Brothers, both of 2622 Poydras St., New Orleans, La. 70119
Filed Sept. 26, 1967, Ser. No. 670,649
Int. Cl. A23b 9/00
U.S. Cl. 99—153                       2 Claims

ABSTRACT OF THE DISCLOSURE

A grain preservative means and method is provided for preserving grain in storage or transit for long periods of time. The preservative means and method enables inhibiting of mold and prevents undesired oxidation of the grain without damage to germination and nutritional value of the grain. A container is provided for use in an enclosed housing which can be a bin, truck, barge or boxcar to preserve high moisture grain. The container carries a volatile mixture of a grain preservative and vent means in the container permitting upward movement of gases derived from the volatile mixture. In the method of this invention, the above-noted container is positioned in a vehicle and grain is positioned in a stack above the container whereby the vehicle can be closed and the volatile gases from the container percolate upwardly through the grain preserving and protecting it.

BACKGROUND OF THE INVENTION

The problems of spoilage of stored grain and spoilage in transit are well-known particularly in the United States where surplus crops for many years have necessitated large scale grain storage and transportation operations. When damp grains are transported or stored they rapidly deteriorate as evidenced by the presence of bacteria, fungi and malodorous products.

Many efforts have been made to overcome the problem of grain deterioration in storage which has led to high expenses in connection with stored grains. Similarly, when grains are transported various aeration and drying methods have been used to preserve the grain which methods have not been altogether successful and are expensive.

SUMMARY OF THE INVENTION

According to the invention, high moisture grain is preserved in transit or in closed containers by positioning an open container carrying a volatile preservative in a bin or vehicle. Grain is then stacked above the container and the housing is substantially closed to the atmosphere whereby the volatile preservative can vaporize and pass upwardly into the grain. The preservative may be one of many known grain preservatives but is preferably a mixture of 80–85% by volume carbontetrachloride and 15–20% by volume of glacial acetic acid.

BRIEF DESCRIPTION OF THE DRAWINGS

The above and other advantages and features of the proposed invention will be better understood from the following specification when read in connection with the accompanying drawings in which.

BRIEF DESCRIPTION OF PREFERRED EMBODIMENTS

Figure 1:
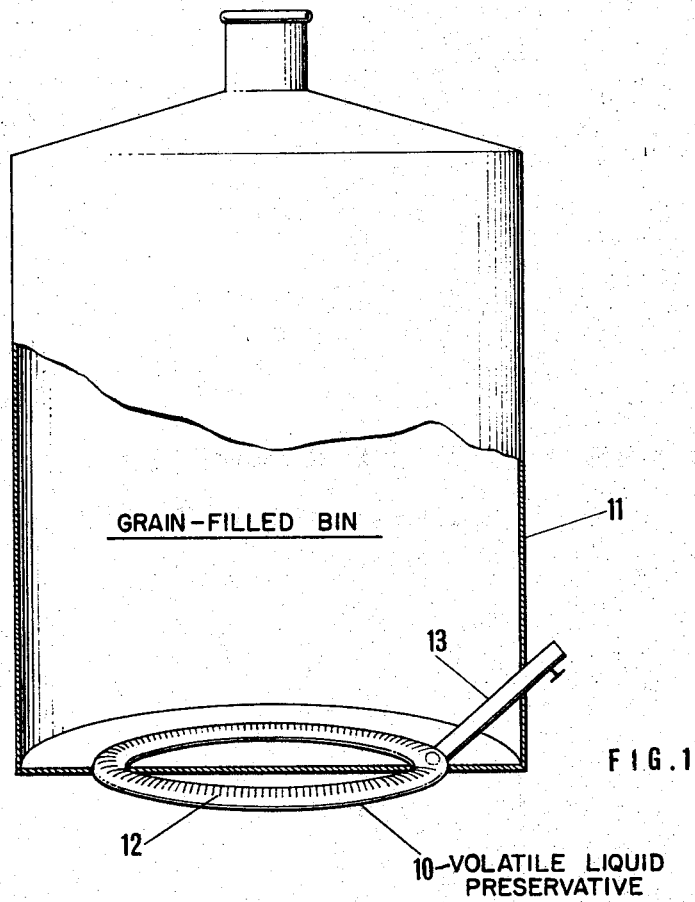
FIG. 1 is a semidiagrammatic view of a preferred embodiment of this invention.

According to the invention, an open container carrying a volatile preservative is positioned in a bin or vehicle and grain is stacked above the container and after which the grain is substantially closed to the atmosphere. As best shown in FIG. 1, a container 10 is positioned within a cylindrical enclosed housing 11 and a volatile preservative is positioned within the container 10.

The preservative can be any of the known preservatives for grains which are volatile at standard room temperature but is preferably a mixture of from 80 to 85% by volume carbontetrachloride and 15 to 20% by volume glacial acetic acid. This particular mixture has been found particularly suitable for use in the combination of this invention to preserve a variety of stored grains which include wheat, corn, rye, oats, rice and similar carbohydrate products.

The container 10 is preferably a hollow donut-shaped container having a plurality of slits 12 passing into the hollow central chamber of the container. The specific dimensions of the container can vary greatly. For example, the container can have an inside diameter of 3' and an outside diameter of 4' with slots 12 having a length of approximately 8". The width of the slots 12 are preferably extremely small and preferably not over ⅛" in order to prevent extremely rapid passage of the preservative out of the container and also to prevent grains from falling through the top wall into the preservative. In the preferred embodiment, a fill line or pipe 13 extends into the container 10. Thus, additional preservative can be metered into the container as necessary as when the container is in use for long periods of time.

Figure 2:
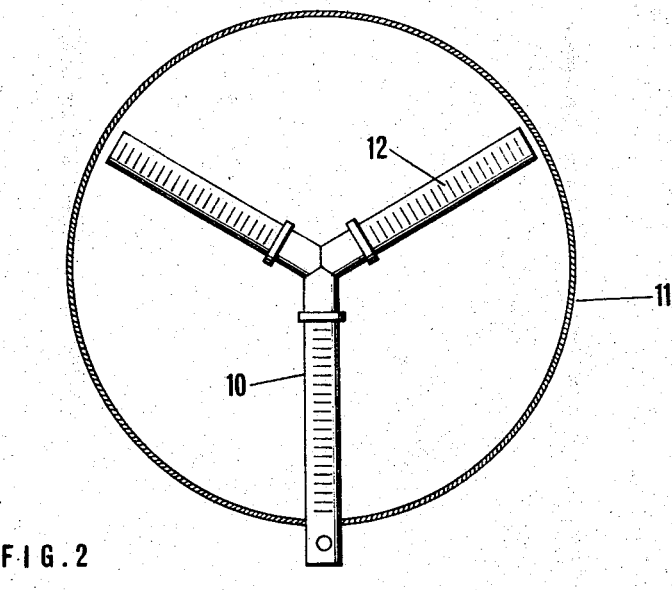
FIG. 2 is a top plan view of an alternate embodiment thereof.

The container can have a variety of shapes and as shown in FIG. 2, a Y-shaped slotted pipe arrangement 14 is shown. It is only important that the container readily fit into the bottom of the housing and be provided with sufficient slots 12 to assure upward movement of the volatile preservative in use.

Plastics, metals or acid-resisting materials can be used in construction of the containers. The cylindrical design shown in FIG. 1 is particularly suitable for use since it readily fits in conventional transportation equipment such as trucks for transportation. In some cases, the container 11 can be used by placing it in the bottom of a boxcar without the need for an additional housing thereby creating a portable silo from the boxcar itself.

In a specific example of this invention, a cylindrical storage bin such as 11 having an inside volume of 6500 cubic feet and a diameter of 15' is opened through an opening port (not shown) and a container 10 having an outside diameter of 5', and an inside diameter of 4' and a cross sectional diameter of 6" is positioned within the container. No fill tube 13 is used. 10 gallons of preservative comprising a mixture of 80% carbontetrachloride and 20% acetic acid is introduced into the container. Slots 3" long and ⅛" wide are positioned as shown in FIG. 1. 500 bushels of corn are then placed in the bin and the bin closed. After a passage of 30 days, the housing is opened and corn stored is found in a sound condition.

Preferably the preservative is used in amounts of 2 to 4 gallons for each 1000 bushels of grain stored in the housing. While the housing 11 is preferably sealed, small amounts of transfer to the atmosphere can be permitted. Thus, as previously pointed out, the size and dimensions of the various elements can vary depending upon the particular grain stored and the transportation envisioned. Similarly, while slots are preferred for use as venting means for the container, holes or other configuration apertures can be employed.

In view of the many modifications, possible, this invention is to be limited only by the spirit and scope of the appended claims.

What is claimed is:
1. A method of preserving high moisture grain in transit or storage comprising, positioning an open container carrying a volatile preservative in a housing, said preservative being a mixture of 80–85% carbontetrachloride and 15–20% by volume glacial acetic acid, positioning said grain in a stack above said container and substantially closing said housing to the atmosphere.

2. A method in accordance with the method of claim 1 wherein said open container is provided with vent means whereby gases derived from said volatile preservative are passed upwardly to said stack.

References Cited

UNITED STATES PATENTS

| | | | |
|---|---|---|---|
| 1,311,709 | 7/1919 | Plaisance | 99—171 X |
| 1,928,903 | 10/1933 | Manning | 99—153 X |
| 2,004,001 | 6/1935 | Henkle | 99—2 |
| 2,032,264 | 2/1936 | Davis | 99—153 |
| 2,417,889 | 3/1947 | Stammelman | 99—150 X |
| 3,341,280 | 9/1967 | Eolkin | 99—150 X |
| 3,346,398 | 10/1967 | Tundermann et al. | 99—171 |

FOREIGN PATENTS

| | | |
|---|---|---|
| 455,846 | 10/1936 | Great Britain. |

OTHER REFERENCES

U.S. Dept. of Agriculture "Flour Mill . . . Control." Cir. 390 July 1937 p. 8. "Stored-Grain . . . Control". Chapman et al. New Jersey Agril. Station #38 (1965) pp. 8 and 9.

NORMAN YUDKOFF, Primary Examiner

F. E. DRUMMOND, Assistant Examiner

U.S. Cl. X.R.

99—225, 237; 21—58